US011573350B1

(12) United States Patent
Schmid et al.

(10) Patent No.: US 11,573,350 B1
(45) Date of Patent: Feb. 7, 2023

(54) PULSED NEUTRON LOGGING TOOL WITH IN-AIR AUTOMATIC SHUTDOWN

(71) Applicant: Weatherford Technology Holdings, LLC, Houston, TX (US)

(72) Inventors: Gregory Schmid, Sugar Land, TX (US); John Willick, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 17/447,538

(22) Filed: Sep. 13, 2021

(51) Int. Cl.
*G01V 5/10* (2006.01)
(52) U.S. Cl.
CPC .................................. *G01V 5/102* (2013.01)
(58) Field of Classification Search
CPC ...................................................... G01V 5/102
See application file for complete search history.

(56) References Cited

U.S. PATENT DOCUMENTS

| 4,432,929 | A | 2/1984 | Bridges | |
|---|---|---|---|---|
| 6,639,210 | B2 * | 10/2003 | Odom | G01T 3/06 |
| | | | | 250/269.6 |
| 6,649,906 | B2 * | 11/2003 | Adolph | G01V 5/101 |
| | | | | 250/269.4 |
| 9,012,836 | B2 | 4/2015 | Wilson et al. | |
| 10,466,384 | B2 * | 11/2019 | McKeon | G01V 5/101 |
| 10,852,283 | B2 * | 12/2020 | Mauborgne | G01N 33/0027 |
| 11,048,015 | B2 | 6/2021 | Schmid et al. | |
| 2015/0041633 | A1 * | 2/2015 | Guo | G01V 5/102 |
| | | | | 250/262 |
| 2019/0187116 | A1 * | 6/2019 | Mauborgne | G01V 5/108 |
| 2020/0150306 | A1 | 5/2020 | Han et al. | |

FOREIGN PATENT DOCUMENTS

CN     106405668 B     6/2019

OTHER PUBLICATIONS

International Search Report and Written Opinion regarding corresponding PCT Application No. PCT/US2022/072232, dated Jul. 7, 2022.

* cited by examiner

*Primary Examiner* — David P Porta
*Assistant Examiner* — Gisselle M Gutierrez
(74) *Attorney, Agent, or Firm* — Lewis & Reese, PLLC

(57) ABSTRACT

Fail-safe methods for deactivating the pulsed neutron generator (PNG) of a logging tool are described herein, as are logging tools configured to execute the fail-safe methods. The fail-safe methods deactivate the PNG if the logging tool is disposed in air outside of a borehole. Measurements taken using one or more gamma ray detectors of the logging tool are used to calculate a value for a parameter that is indicative of the tool being disposed in an air environment. Examples of such parameters include ratios of capture gamma rays and burst gamma rays. The disclosed methods operate without reference to sensors and/or control from outside the tool. The methods do not inadvertently deactivate the tool when it encounters an air-filled borehole.

20 Claims, 4 Drawing Sheets

US 11,573,350 B1

PULSED NEUTRON LOGGING TOOL WITH IN-AIR AUTOMATIC SHUTDOWN

FIELD OF THE INVENTION

The present application relates to pulsed neutron logging tools for the logging of boreholes in oil and gas operations, and more particularly, to a pulsed neutron logging tool with a safety feature that causes the pulsed neutron generator (PNG) to shut down when the tool is in air outside of a borehole.

INTRODUCTION

Oil and gas well service providers use a variety of measurements to determine if wells are producing to their potential, if they are maintaining their integrity, and if interventions are needed to improve production or to otherwise repair or rejuvenate aging wells. Pulsed neutron measurements are one type of measurement available to well service providers. Pulsed neutron measurements can be used to identify oil and gas in geological formations, evaluate hydrocarbon production, characterize the porosity of formations, and determine the condition of certain features of a well, such as gravel pack integrity.

A well service provider uses a tool called a pulsed neutron logging tool to perform pulsed neutron measurements. FIG. 1 illustrates a section of a wellbore 100 extending into a formation 101. The illustrated wellbore 100 is stabilized by a casing 103 held against the formation 101 by cement 104. The cylindrical volume 102, which is that part of the wellbore located inside the inner radius of the casing annulus, is filled with a borehole fluid and/or gas. A pulsed neutron logging tool 105 may be lowered into the wellbore using a wireline 106 or another mode of conveyance, as described in more detail below. The pulsed neutron logging tool 105 includes a pulsed neutron generator (PNG), and one or more detectors, labeled here as ND (near detector) and ED (far detector) in FIG. 1.

During a pulsed neutron measurement, the PNG generates neutrons, which are released from the pulsed neutron logging tool 105 at greater than 1 MeV and typically about 14 MeV. The neutrons are represented as straight arrows labeled n in FIG. 1. The high-energy neutrons can undergo a variety of interactions with matter in the cylindrical volume 102, the casing 103, the cement 104, and the formation 101.

FIG. 2 illustrates three types of such interactions. One possible interaction is an elastic collision, also called elastic scattering, between a neutron n and a nucleus. In the illustrated example, the neutron n collides with a hydrogen nucleus having a single proton p. Hydrogen is omnipresent in most formations due to the pore spaces being filled with liquid hydrocarbons or water. In the elastic scattering process, the neutron n imparts some of its energy to the proton p, causing the proton to gain energy and the neutron to lose energy (i.e., to slow down). Elastic scattering plays a major role in the slowing down of fast neutrons. It is well known in the art that the liquid-filled porosity can be inferred by measuring the slowing down distance of fast neutrons.

In an inelastic collision, also called inelastic scattering, a neutron collides with a nucleus, imparting a portion of the neutron's energy to the nucleus. The neutron exits the collision with less energy than before. The energy that is transferred to the nucleus excites the nucleus, which subsequently emits a gamma (γ) photon when the nucleus relaxes. Nuclei of different atoms emit gamma photons having different energies. Therefore, the energy of the emitted gamma photon is indicative of the type of nucleus involved in an inelastic collision. For example, one can determine the ratios of carbon (indicative of hydrocarbons), oxygen (indicative of water), silicon (indicative of sandstone), and calcium (indicative of limestone) by measuring the energies of gamma photons generated during inelastic collisions with atoms of those substances near a wellbore.

Notice that both elastic and inelastic scattering cause neutrons to lose energy. After a high energy neutron has undergone a number of collisions, its energy will be reduced. Neutrons having an energy above approximately 0.5 MeV are considered fast neutrons. Fast neutrons can trigger gamma rays due to inelastic scattering, as described above. Neutrons that are slowed to about 0.4 to 100 eV are considered "epithermal neutrons" and neutrons that are slowed to about 0.025 eV are referred to as "thermal neutrons." Epithermal and thermal neutrons can participate in a third type of interaction whereby the neutron is "captured" by the nucleus of an atom. This capture forms a compound state that can then decay by particle and/or gamma emission. In addition, any residual nuclei that remain after the decay can also, in some cases, decay by particle and/or gamma emission. The gamma rays emitted following a neutron capture on a nucleus have a tendency to be characteristic of that particular nucleus. As such, the type of atom participating in the capture event can be identified based on the energy spectrum of the emitted photons. The strength of the photon signal from a given element is related to the probability for neutron capture on that particular element. This probability is quantified as the "capture cross section" and has units of "barns." When multiplied by the number density of that particular type of atom in the formation, the result is the "macroscopic cross section," also called "sigma," and is typically expressed in "capture units" (c.u.). The sigma values for all the elements in the formation will add together to give the total formation sigma value ($\Sigma$). The higher the sigma value, the quicker a population of thermal neutrons will decay.

FIG. 3 shows the layout of a typical pulsed neutron logging tool 300. Subsection 302 houses an array of detector assemblies as well as a PNG 304. There are four gamma detector assemblies in the illustrated embodiment, each comprising a $LaBr_3$ crystal coupled to a photomultiplier tube and a digital spectrometer for filtering and pulse inspection. These detector assemblies are referred to as the Proximal (Prox) detector assembly 306, the Near detector assembly 308, the Far detector assembly 310, and Long detector assembly 312. These detector assemblies are disposed at increasing axial spacings from the PNG 304, as their names imply. Between the near detector assembly 308 and the far detector assembly 310 is disposed a fast neutron detector 314 that measures the fast neutron flux.

The subsection 302 is operationally connected to an electronics subsection 316. The electronics subsection houses control circuits and power circuits to operate and control the elements of the subsection 302. A telemetry subsection 318 is operationally connected to the electronics section 316. The instrument subsection may contain the electronics and processors for operating the various components of the tool 300. A suitable connector connects the logging tool to a lower end of a preferably multiconductor logging cable 320. The upper end of the logging cable 320 terminates at a draw works, which is well known in the art and is not shown in the illustration. It should be noted that other embodiments of a logging tools are within the scope of the disclosure. For example, the illustrated embodiment is an example of a tool configured to be conveyed into a wellbore via a cable, such as logging cable 320. However, other embodiments may be included as a part or subsection of other conveyed components, for example, as part of a drilling string for LWD/MWD applications. Moreover, although shown embodied in a wireline logging tool, the detector assembly 302 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

When the tool 300 is not downhole (or in another controlled environment) it is typically desirable that the PNG 304 be deactivated because exposure to fast neutrons can be dangerous to human health. When the tool is used in wireline operations, which provide communication with and control of the tool from the surface, the operator can simply shut down the PNG before the tool reaches the surface. Some techniques involve monitoring the depth and/or borehole pressure at the tool-string location and deactivating the PNG when these numbers fall below a threshold. But these criteria rely on external measurement devices that can be accidentally turned off, malfunction, or may not be present. Also, other means must be used to deactivate the PNG if logging is conducted without communication with the surface, such as during memory logging, wherein the tool is conveyed using coiled tubing or slick line, for example. Typically, during memory logging a timer is used to turn off the PNG at a time selected to correspond to the time the tool is expected to be near the surface. However, that method can fail if the trip timing deviates from the expected time, causing the PNG to turn off too soon or too late. If the PNG turns off too late, it could result in unwanted radiation at the surface. A possible counter-measure is to deploy radiation monitors at the surface. When the radiation monitors detect radiation from the tool they can deliver a shut-down command to the PNG. However, those monitors may be unreliable because they are located too far away, may be turned off, malfunctioning, or missing entirely.

When a tool such as tool 300 is used in a laboratory setting, the tool is typically run inside a block or tank. To enable such measurements, which are done at 1 atm of pressure and at surface depth, it is standard practice to intentionally disable the pressure/depth turn-off criteria discussed above. Instead, the safety approach that is used to prevent "in-air" firing is to operate an external radiation monitor, and to shut down the PNG if the readings go above a prescribed threshold. However, the external monitor can be too far away, malfunctioning, turned off, or relying on a preset threshold that has been incorrectly set. Furthermore, if the PNG is turned on by accident, there may be no preparation at all for the presence of radiation, and therefore no radiation monitors nearby to trigger the alarm.

Accordingly, there is a need in the art for a reliable fail-safe method and system for turning off a PNG of a logging tool when the tool is located in an air environment outside a borehole. The methods and systems should overcome the drawbacks discussed above. Ideally the fail-safe methods/systems would be entirely self-contained and would operate independent of any communication with the surface or with other sensors outside of the tool itself. Also, the methods and systems should not inadvertently deactivate the PNG if the tool encounters an air environment within a borehole.

SUMMARY

Disclosed herein is a method of deactivating a pulsed neutron generator (PNG) of a logging tool, wherein the logging tool comprises the PNG and at least one gamma ray detector, the method comprising: using the at least one gamma ray detector to provide first gamma ray measurements and second gamma ray measurements, wherein the first gamma ray measurements indicate gamma rays detected during bursts of the PNG and the second gamma ray measurements indicate gamma rays detected between the bursts of the PNG, calculating a value for a parameter using the first and second gamma ray measurements, and determining whether to deactivate the PNG based on the value of the parameter. According to some embodiments, determining whether to deactivate the PNG based on the value of the parameter comprises determining if the value meets a shut-down criteria. According to some embodiments, the parameter comprises a ratio of the first and second gamma ray measurements. According to some embodiments, the ratio comprises a ratio of the second gamma ray measurement to the first gamma ray measurement and wherein the shut-down criteria is that the value of the ratio is less than a predetermined threshold value. According to some embodiments, the ratio comprises a ratio of the first gamma ray measurement to the second gamma ray measurement and wherein the shut-down criteria is that the value of the ratio is greater than a predetermined threshold value. According to some embodiments, the bursts of the PNG occur during burst intervals and the PNG is turned off during decay intervals that follow the burst intervals, the PNG cycles between burst and decay intervals, and the first gamma ray measurements are determined during burst gates configured within the burst intervals and the second gamma ray measurements are determined during captures gates configured within the decay intervals. According to some embodiments, the method further comprises accumulating gamma ray counts detected during the burst gate over an integration duration in a first bin and accumulating gamma ray counts detected during the capture gate over the integration duration in a second bin. According to some embodiments, the integration duration is about 1 second to about 10 seconds. According to some embodiments, the tool comprises at least two gamma ray detectors and the method comprises: determining first and second gamma ray measurements for at least two of the gamma ray detectors, using the first and second gamma ray measurements determined for each of the gamma ray detectors to calculate a value of the parameter for each of the detectors, and using the values of the parameters for each of the detectors to determine whether to deactivate the PNG. According to some embodiments, using the values of the parameters for each of the detectors to determine whether to deactivate the PNG comprises determining to deactivate the PNG only if the values for both of the detectors meet a shut-down criteria.

Also disclosed herein is a logging tool comprising: a pulsed neutron generator (PNG), at least one gamma ray detector, and control circuitry configured to: use the at least one gamma ray detector to provide a first gamma ray measurement and a second gamma ray measurement, wherein the first gamma ray measurement indicates gamma rays detected during bursts of the PNG and the second gamma ray measurement indicates gamma rays detected between bursts of the PNG, calculate a value for a parameter using the first and second gamma ray measurements, and determine whether to deactivate the PNG based on the value of the parameter. According to some embodiments, determining whether to deactivate the PNG based on the value of the parameter comprises determining if the value meets a shut-down criteria. According to some embodiments, the parameter comprises a ratio of the first and second gamma ray measurements. According to some embodiments, the ratio comprises a ratio of the second gamma ray measurement to the first gamma ray measurement and wherein the shut-down criteria is that the value of the ratio is less than a predetermined threshold value. According to some embodiments, the ratio comprises a ratio of the first gamma ray measurement to the second gamma ray measurement and wherein the shut-down criteria is that the value of the ratio is greater than a predetermined threshold value. According to some embodiments, the bursts of the PNG occur during burst intervals and the PNG is turned off during decay intervals that follow the burst intervals, the PNG cycles between burst and decay intervals, and the first gamma ray measurements are determined during burst gates configured within the burst intervals and the second gamma ray measurements are determined during captures gates configured within the decay intervals. According to some embodiments, the control circuitry is further configured to accumulate gamma ray counts detected during the burst gate over an integration duration in a first bin and accumulate gamma ray counts detected during the capture gate over the integration duration in a second bin. According to some embodiments, the integration duration is about 1 second to about 10 seconds. According to some embodiments, the tool comprises at least two gamma ray detectors and wherein the control circuitry is configured to: determine first and second gamma ray measurements for at least two of the gamma ray detectors, use the first and second gamma ray measurements determined for each of the gamma ray detectors to calculate a value of the parameter for each of the detectors, and use the values of the parameters for each of the detectors to determine whether to deactivate the PNG.

The invention may also reside in a non-transitory computer-readable medium comprising instructions, such as programming code, which, when executed on a computing device, configures the computing device to perform the methods described above. The invention may also reside in a computing device configured to perform the methods described above.

DESCRIPTION

Pulsed neutron logging is well known in the art. See, e.g., U.S. Pat. Nos. 11,048,015; 10,466,384; and 9,012,836. Accordingly, the details of conducting pulsed neutron logging measurements are not described here in depth. Briefly, during a pulsed neutron logging measurement, the PNG emits bursts of fast neutrons during a burst interval. The length of burst interval may depend on the particular tool and/or on the particular type of measurement, and is typically on the order of 10s of microseconds to 100s of microseconds. The burst interval is followed by an interval during which the PNG does not emit neutrons. That interval is referred to herein as a "decay interval." According to some embodiments, the decay interval may be 100s of microseconds. The sequence of burst and decay intervals can repeat thousands of times per second. During this time, one or more detectors, such as the gamma detectors and/or the fast neutron detector described above, are active. The embodiments described in this disclosure primarily involve gamma ray detection. The signals detected by the detectors may be binned as a function of time and/or energy and may undergo processing, such as deadtime correction, background subtraction, or the like, as is known in the art.

Figure 4:
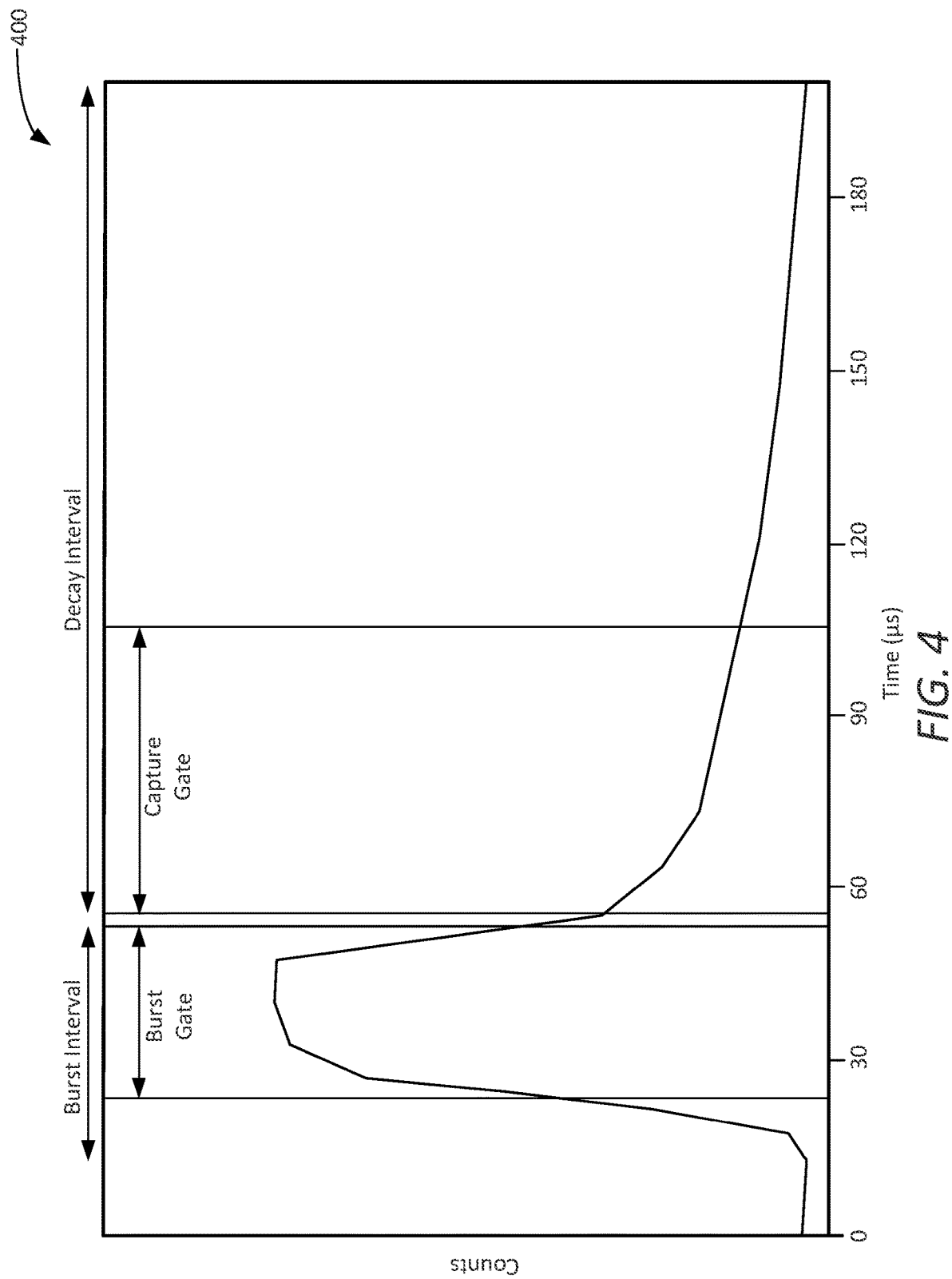
FIG. 4 shows a measured temporal profile of the Near gamma ray count rate during a pulsed neutron logging measurement.

FIG. 4 shows the measured temporal profile (i.e., a time spectrum) 400 of the gamma ray count rate in the near detector of a tool, such as the tool 300, during a pulsed neutron measurement. In the illustrated pulsed neutron measurement, the PNG generates neutrons during a burst lasting about 30 μs. The gamma rays detected during the burst interval include gamma rays generated by both inelastic scattering and thermal capture. A decay interval follows the burst and lasts until the end of the cycle. Gamma rays detected during the decay interval arise from thermal capture events occurring in the borehole and from thermal capture events occurring in the formation. As mentioned above, the cycle of burst and decay intervals can be repeated thousands of times per second.

FIG. 4 also illustrates two gates, referred to herein as the burst gate and the capture gate. The burst gate can be configured to correspond to at least a portion, or all, of the burst interval. The capture gate can be configured to correspond to at least a portion, or all, of the decay interval. The widths of the burst and capture gates may vary depending on the tool and/or the application. As explained in more detail below, as the PNG cycles between the burst interval and the decay interval, gamma rays detected during the burst gate are saved in a "burst" bin and gamma rays detected during the capture gate are saved in a "capture" bin. This process repeats for a given amount of time, referred to herein as the "integration duration." The integration duration may be a few seconds, for example. The gamma counts accumulated in the burst and capture bins over an integration duration can be used to calculate one or more parameters that can serve as control variables for determining whether to disable the PNG. For example, the inventors have determined that the capture/burst ratio can be used as such a control variable. As described in more detail below, if the capture/burst ratio falls below a predetermined threshold value, the PNG may be shut off.

Figure 5:
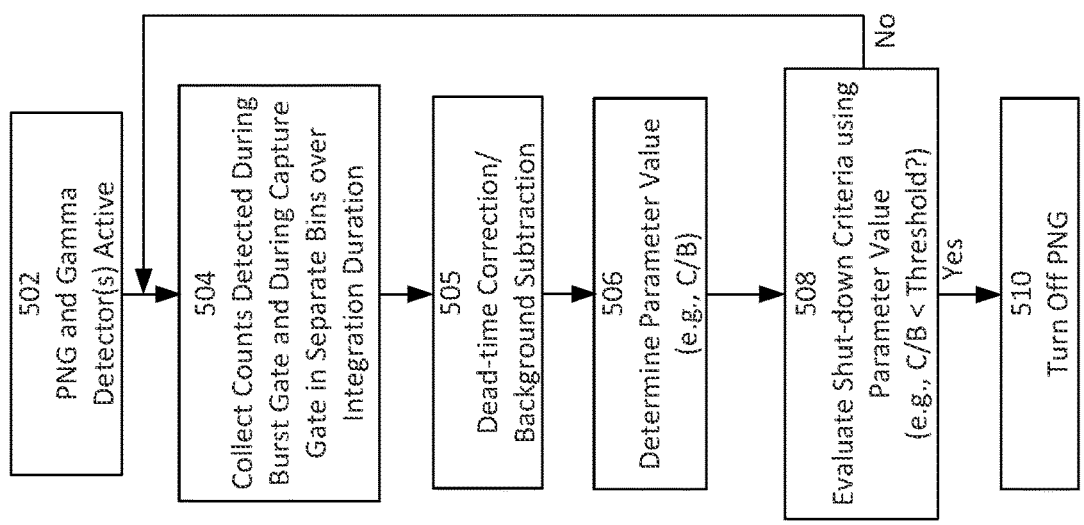
FIG. 5 shows an embodiment of an algorithm for determining whether to deactivate a PNG.

FIG. 5 illustrates an embodiment of a fail-safe shutdown algorithm 500, as disclosed herein. At step 502, the PNG and gamma detector(s) are active, for example, during a pulsed neutron logging operation. As described above, during the pulsed neutron measurement the PNG sequentially generates fast neutrons during a burst interval, followed by an off interval during which the PNG does not generate neutrons. During this whole sequence one or more of the gamma detectors are active for detecting gamma rays emitted from the formation and the wellbore. The measurements recorded at the one or more gamma detectors as a function of time yield a temporal profile similar to the temporal profile 400 shown in FIG. 4.

At step 504, the algorithm collects all of the gamma ray counts detected during the burst gate into a "burst bin," and all of the gamma ray counts detected during capture gate into the "capture bin." As explained above, the PNG can cycle between burst intervals and decay intervals thousands of times per second. At step 504, the burst and capture gamma rays are collected in their respective bins for an integration period, which, according to some embodiments, may be from 1 second, up to about 10 seconds. Thus, the burst and capture bins will collect counts over thousands of cycles of the PNG. This accumulates enough counts in each of the bins to provide an accurate calculation of the parameter(s) discussed below. At step 505 (or during step 504), various data processing may be applied, for example, deadtime correction and/or background subtraction, as is known in the art.

At step 506, the algorithm determines a parameter value using the capture count stored in the capture bin and the burst count stored in the burst bin. For example, the parameter value may be determined by a mathematical operation using the measured capture and burst values. In this discussion, the capture count value is abbreviated as "C" and the burst count value is abbreviated as "B." The parameter may be a ratio, such as C/B or B/C. Other ratios are possible, e.g., C/(B+C). The parameter may be a mathematical relationship other than a ratio. Once the parameter is calculated the capture and burst bins may be emptied.

At step 508, the algorithm uses the parameter value to determine whether to deactivate the PNG. For example, the algorithm may compare the parameter value to a threshold. For example, if the parameter is a ratio C/B, then the shut-down criteria may be to deactivate the PNG if the parameter value is less than a predetermined threshold value. Note that methods for determining an appropriate threshold value are discussed below. If the parameter is a ratio B/C, then the shut-down criteria may be to deactivate the PNG if the parameter value is greater than a predetermined threshold value.

The inventors have discovered that the capture/burst ratio is a useful value for determining if the tool is in air outside of a borehole environment. Note that the inverse of the capture/burst ratio, (i.e., burst/capture) could also be used, in which a number greater than a predetermined ratio indicates that the tool is suspended in air.

Figure 6:
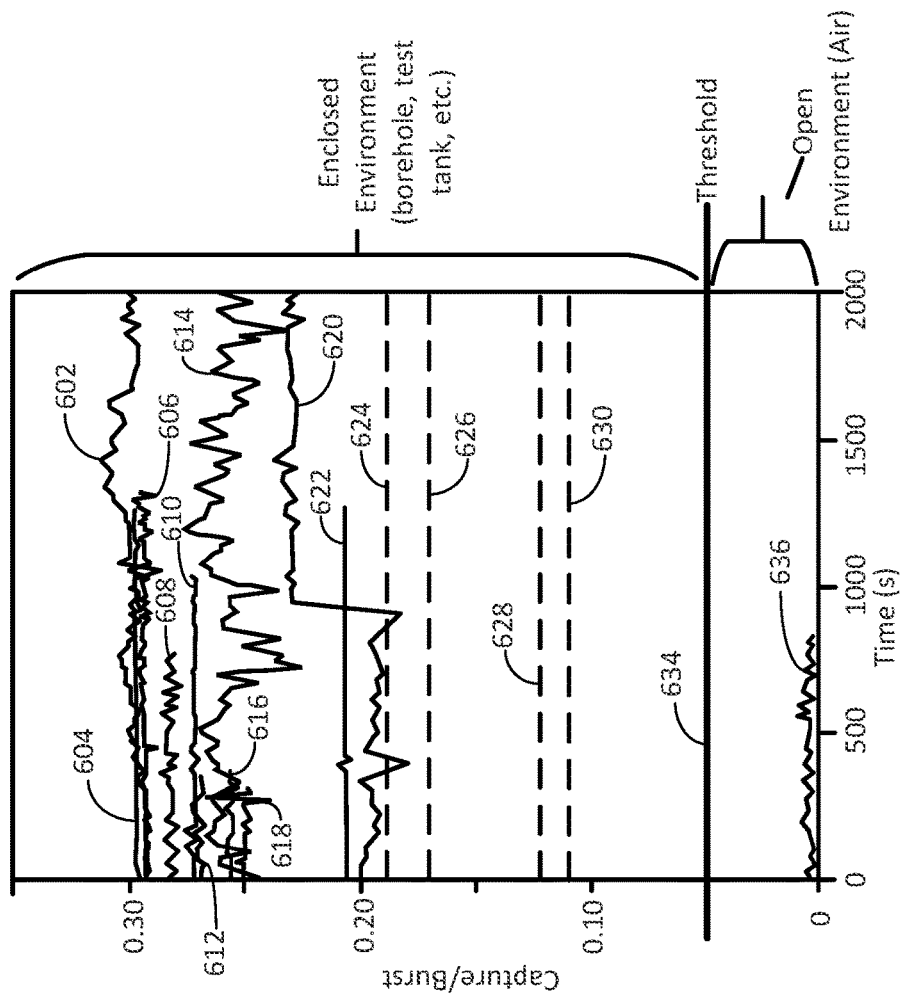
FIG. 6 shows values for capture/burst ratios in the Near detector determined using a logging tool in various environments.

FIG. 6 shows the capture/burst ratio for the near detector measured or calculated for a variety of different tool environments. The various environments are as follows:

602: Field log of cased-hole oil well filled with saltwater;
604: Lab measurement in low porosity cased-hole marble block filled with water;
606: Lab measurement in low porosity open-hole marble block filled with water;
608: Lab measurement in large water-filled tank;
610: Lab measurement in water-filled calibration tank;
612: Lab measurement in low porosity limestone block filled with water;
614: Field log of Test Well #1 (Cased-Hole filled with water);
616: Lab measurement in mid-porosity open-hole limestone block filled with water;
618: Lab measurement in high-porosity open-hole limestone block filled with water;
620: Field log of Test Well #2 (Cased-hole and Open-hole filled with water);
622: Lab measurement in mid-porosity open-hole sandstone block filled with air;
624: Computer simulation (MCNP) of tool in 6" Marble Block, Air-filled Open-Hole, time-averaged;
626: Computer simulation (MCNP) of tool in 8" Marble Block, Air-filled Open Hole, time-averaged;
628: Computer simulation (MCNP) of tool in 12" Marble Block, Air-filled Open Hole, time-averaged; and
630: Computer simulation (MCNP) of tool in 16" Marble Block, Air-filled Open Hole, time-averaged.

In the embodiment illustrated in FIG. 6 (Near detector), a capture/burst ratio of 0.05 was chosen as a shut-off threshold value 634. All of the values above the threshold value correspond to tool environments that are enclosed, for example, various boreholes, testing tanks, and simulated values for such environments. The values below the threshold value may be assumed to indicate that the tool may be in air and may need to be shut down. For example, if the tool may have been pulled out of an oil-well borehole hole into open air while still running. The plot 636 in FIG. 6 is the capture/burst ratio measured when the tool was hanging in air. Note that the plot 636 falls well below the shut-off threshold value, and would thus trigger the tool to shut off. In some embodiments, the tool may be pulled from a borehole into a lubricator/riser pipe hanging from a crane. MCNP simulations show that for embodiments of the tool (1.7" OD) in a slim riser-pipe (2.5" ID) filled with brine, the capture/burst ratio falls well below the threshold, and would also trigger the tool to shut off. Of course, the particular shut-off threshold value will vary depending on the tool, the detector, and other factors. According to some embodiments, the tool may be calibrated by determining capture/burst ratios for any downhole environments the tool might encounter, determining a capture/burst ratio for the tool hanging in air or other undesired environments, and setting the shut-off threshold value accordingly.

Referring again to step 508 of the algorithm 500 (FIG. 5), according to some embodiments, the algorithm may require the shut-off criteria to be met for one integration duration, 1-10 seconds, or perhaps multiple sequential integration durations before deactivating the PNG. This is to prevent inadvertently deactivating the PNG because of a glitch.

According to some embodiments, the algorithm 500 is based on readings from a single detector, typically a single gamma ray detector (e.g., the near detector). Accordingly, the algorithm can be used for tools having only single detectors. According to some embodiments that may be implemented using tools with multiple detectors, the algorithm may consider readings from more than one of the detectors. For example, the algorithm may operate based on two or more gamma ray detectors and may require that the value of the parameter determined based on readings of at least two of the detectors to meet the shut-off criteria before deactivating the PNG. For example, referring to the tool 300 (FIG. 3), an embodiment of the algorithm may consider readings from the Near detector 308 and from the long Far detector 310. The algorithm could calculate values of a parameter (such as the capture/burst ratio) for each of those detectors and only deactivate the PNG if the values of the parameters of both of the detectors meet the shut-off criteria.

Notice that the algorithm does not require a highly resolved time spectrum, or any other detailed spectral analysis of the gamma ray counts for its operation. The time spectrum 400 (FIG. 4) is useful for understanding the algorithm, but is not required for its operation. At its simplest, the algorithm 500 only needs a reading of gamma counts collected during the burst gate and a reading of gamma counts collected during the capture gate. Notice, also, that the described methods and algorithms are based on readings of gamma ray detectors only, and not on neutron detectors. However, according to some embodiments, neutron detector readings could be combined with the methods and algorithms described herein.

Figure 1:
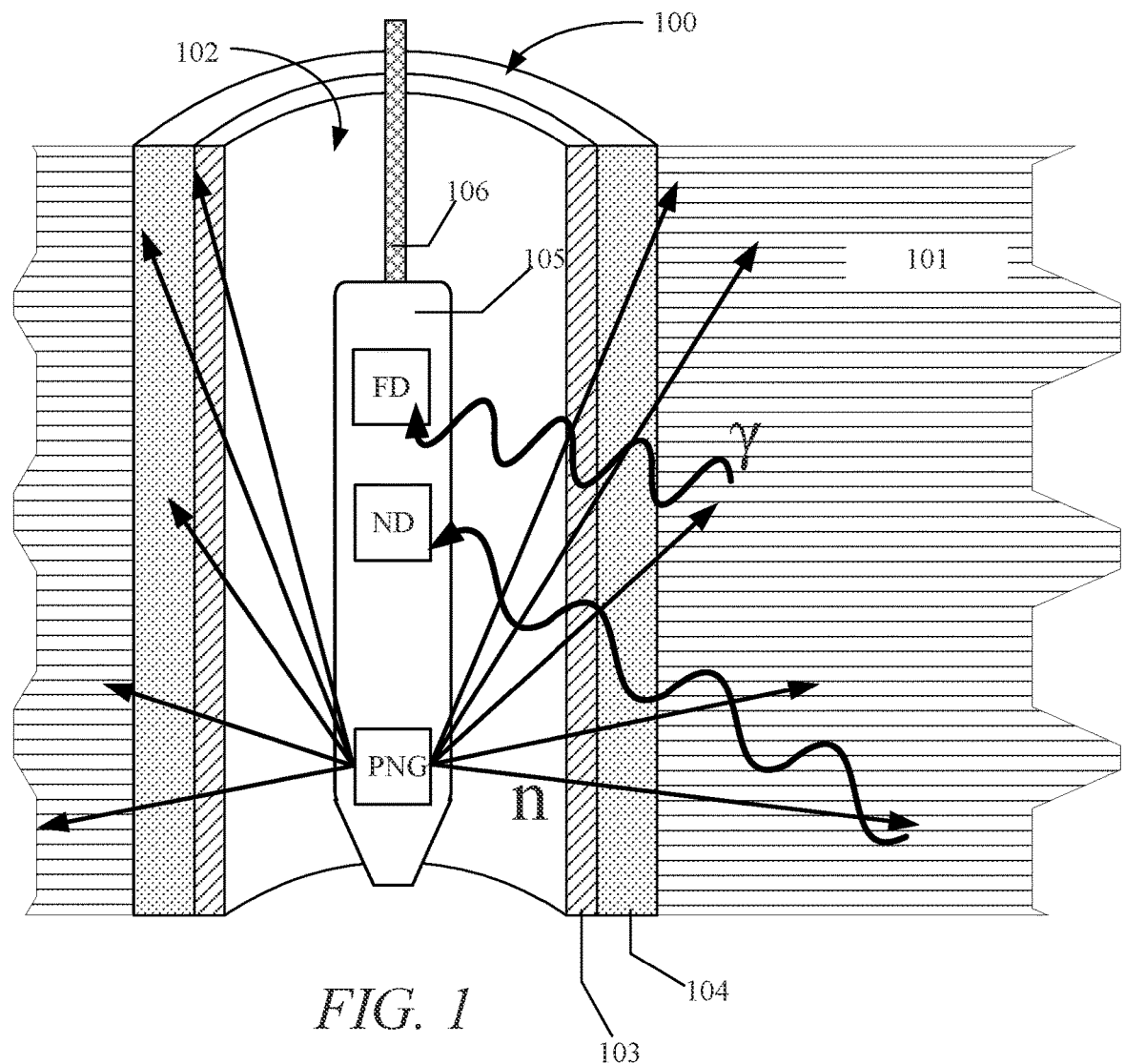
FIG. 1 shows a pulsed neutron logging tool conveyed into a wellbore.
Figure 2:
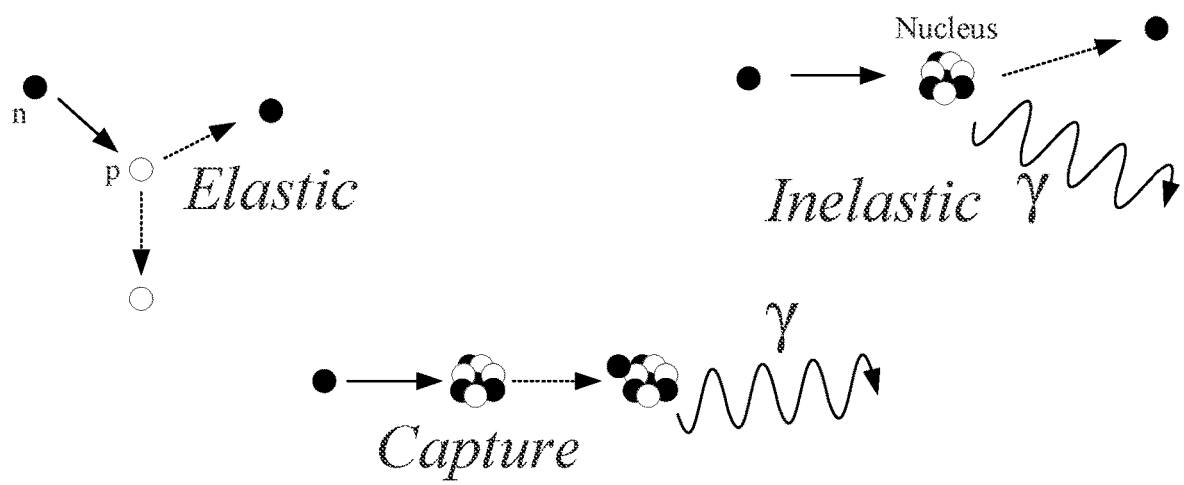
FIG. 2 shows interactions of fast neutrons.
Figure 3:
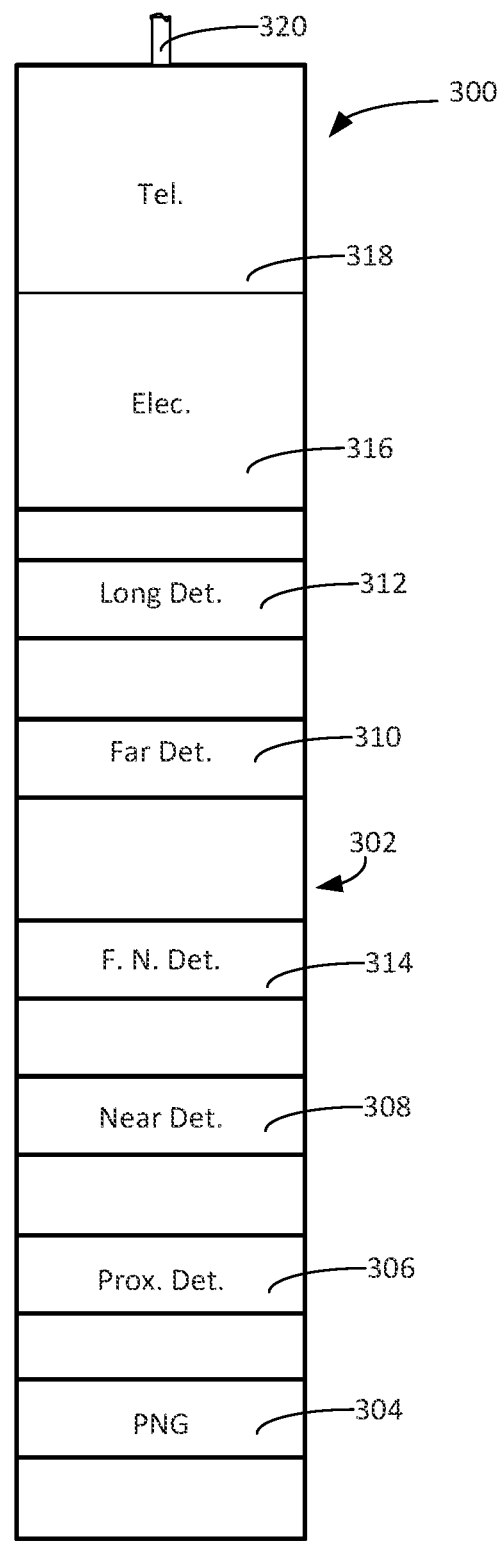
FIG. 3 shows an embodiment of a logging tool according to aspects of the disclosure.

The methods and algorithms described herein for a fail-safe shut-off of the PNG may be embodied in processing circuitry (a.k.a. control circuitry) that is configured to perform the methods and algorithms. According to some embodiments, the control circuitry can be so configured by executing programming code, for example, stored in non-transitory computer-readable media, as described below. According to some embodiments, the control circuitry can be configured within the tool itself, for example, within the electronics section 316 of the tool (FIG. 3). Accordingly, the methods and algorithms may be executed to provide fail-safe shut-off protection without the tool needing to communicate with the surface. The fail-safe shut-off protection may operate to deactivate the PNG automatically if the right conditions are met and not require intervention by a human.

Some portions of the detailed description were presented in terms of processes, methods, programs, and workflows. These processes, methods, programs, and workflows are the means used by those skilled in the data processing arts to most effectively convey the substance of their work to others skilled in the art. A process or workflow is here, and generally, conceived to be a self-consistent sequence of steps (instructions) contained in memory and run using processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. As used herein the term "about" generally means plus or minus 10 percent of the referenced value.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability. According to some embodiments, the models and/or databases may be stored in a non-transitory computer-readable medium.

While the invention herein disclosed has been described in terms of specific embodiments and applications thereof, numerous modifications and variations could be made thereto by those skilled in the art without departing from the scope of the invention set forth in the claims.

What is claimed is:

1. A method of deactivating a pulsed neutron generator (PNG) of a logging tool, wherein the logging tool comprises the PNG and at least one gamma ray detector, the method comprising:
   using the at least one gamma ray detector to provide first gamma ray measurements and second gamma ray measurements, wherein the first gamma ray measurements indicate gamma rays detected during bursts of the PNG and the second gamma ray measurements indicate gamma rays detected between the bursts of the PNG,
   calculating a value for a parameter using the first and second gamma ray measurements, and
   determining whether to deactivate the PNG based on the value of the parameter.

2. The method of claim 1, wherein determining whether to deactivate the PNG based on the value of the parameter comprises determining if the value meets a shut-down criteria.

3. The method of claim 2, wherein the parameter comprises a ratio of the first and second gamma ray measurements.

4. The method of claim 3, wherein the ratio comprises a ratio of the second gamma ray measurement to the first gamma ray measurement and wherein the shut-down criteria is that the value of the ratio is less than a predetermined threshold value.

5. The method of claim 3, wherein the ratio comprises a ratio of the first gamma ray measurement to the second gamma ray measurement and wherein the shut-down criteria is that the value of the ratio is greater than a predetermined threshold value.

6. The method of claim 1, wherein:
   the bursts of the PNG occur during burst intervals and the PNG is turned off during decay intervals that follow the burst intervals,
   the PNG cycles between burst and decay intervals, and
   the first gamma ray measurements are determined during burst gates configured within the burst intervals and the second gamma ray measurements are determined during captures gates configured within the decay intervals.

7. The method of claim 6, further comprising accumulating gamma ray counts detected during the burst gate over an integration duration in a first bin and accumulating gamma ray counts detected during the capture gate over the integration duration in a second bin.

8. The method of claim 7, wherein the integration duration is about 1 second to about 10 seconds.

9. The method of claim 1, wherein the tool comprises at least two gamma ray detectors and wherein the method comprises:
   determining first and second gamma ray measurements for at least two of the gamma ray detectors,
   using the first and second gamma ray measurements determined for each of the gamma ray detectors to calculate a value of the parameter for each of the detectors, and
   using the values of the parameters for each of the detectors to determine whether to deactivate the PNG.

10. The method of claim 9, wherein using the values of the parameters for each of the detectors to determine whether to deactivate the PNG comprises determining to deactivate the PNG only if the values for both of the detectors meet a shut-down criteria.

11. A logging tool comprising:
a pulsed neutron generator (PNG),
at least one gamma ray detector, and
control circuitry configured to:
use the at least one gamma ray detector to provide a first gamma ray measurement and a second gamma ray measurement, wherein the first gamma ray measurement indicates gamma rays detected during bursts of the PNG and the second gamma ray measurement indicates gamma rays detected between bursts of the PNG,
calculate a value for a parameter using the first and second gamma ray measurements, and
determine whether to deactivate the PNG based on the value of the parameter.

12. The tool of claim 11, wherein determining whether to deactivate the PNG based on the value of the parameter comprises determining if the value meets a shut-down criteria.

13. The tool of claim 12, wherein the parameter comprises a ratio of the first and second gamma ray measurements.

14. The tool of claim 13, wherein the ratio comprises a ratio of the second gamma ray measurement to the first gamma ray measurement and wherein the shut-down criteria is that the value of the ratio is less than a predetermined threshold value.

15. The tool of claim 13, wherein the ratio comprises a ratio of the first gamma ray measurement to the second gamma ray measurement and wherein the shut-down criteria is that the value of the ratio is greater than a predetermined threshold value.

16. The tool of claim 11, wherein:
the bursts of the PNG occur during burst intervals and the PNG is turned off during decay intervals that follow the burst intervals,
the PNG cycles between burst and decay intervals, and
the first gamma ray measurements are determined during burst gates configured within the burst intervals and the second gamma ray measurements are determined during captures gates configured within the decay intervals.

17. The tool of claim 16, wherein the control circuitry is further configured to accumulate gamma ray counts detected during the burst gate over an integration duration in a first bin and accumulate gamma ray counts detected during the capture gate over the integration duration in a second bin.

18. The tool of claim 17, wherein the integration duration is about 1 second to about 10 seconds.

19. The tool of claim 11, wherein the tool comprises at least two gamma ray detectors and wherein the control circuitry is configured to:
determine first and second gamma ray measurements for at least two of the gamma ray detectors,
use the first and second gamma ray measurements determined for each of the gamma ray detectors to calculate a value of the parameter for each of the detectors, and
use the values of the parameters for each of the detectors to determine whether to deactivate the PNG.

20. The tool of claim 19, wherein using the values of the parameters for each of the detectors to determine whether to deactivate the PNG comprises determining to deactivate the PNG only if the values for both of the detectors meet a shut-down criteria.

* * * * *